C. J. McCORD.
SPRING WHEEL.
APPLICATION FILED NOV. 12, 1918.

1,309,532.

Patented July 8, 1919.
2 SHEETS—SHEET 1.

Witnesses

Inventor
Charles J. McCord.

By Victor J. Evans
Attorney

C. J. McCORD.
SPRING WHEEL.
APPLICATION FILED NOV. 12, 1918.
1,309,532.
Patented July 8, 1919.
2 SHEETS—SHEET 2.
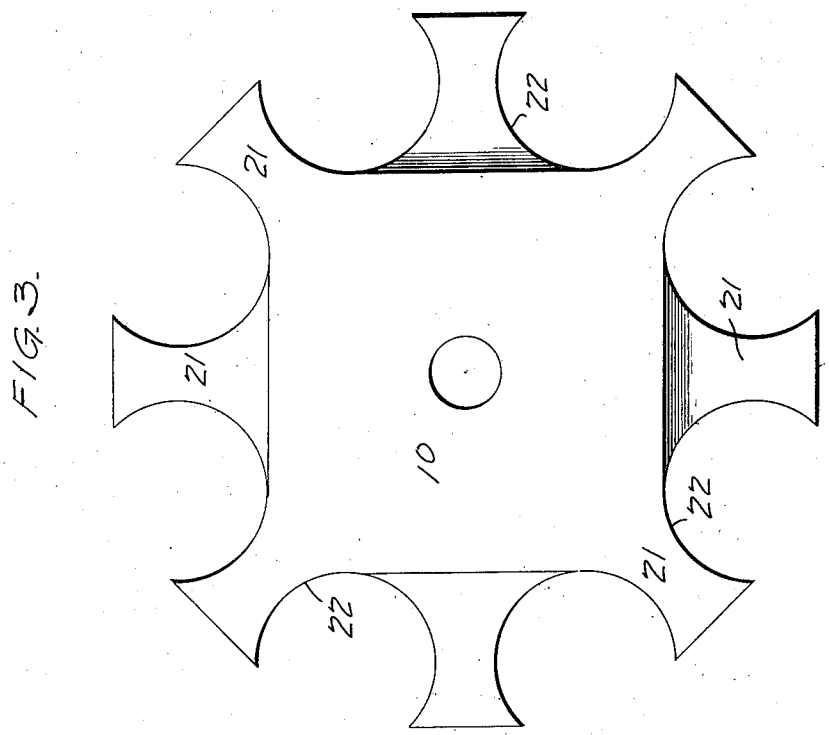
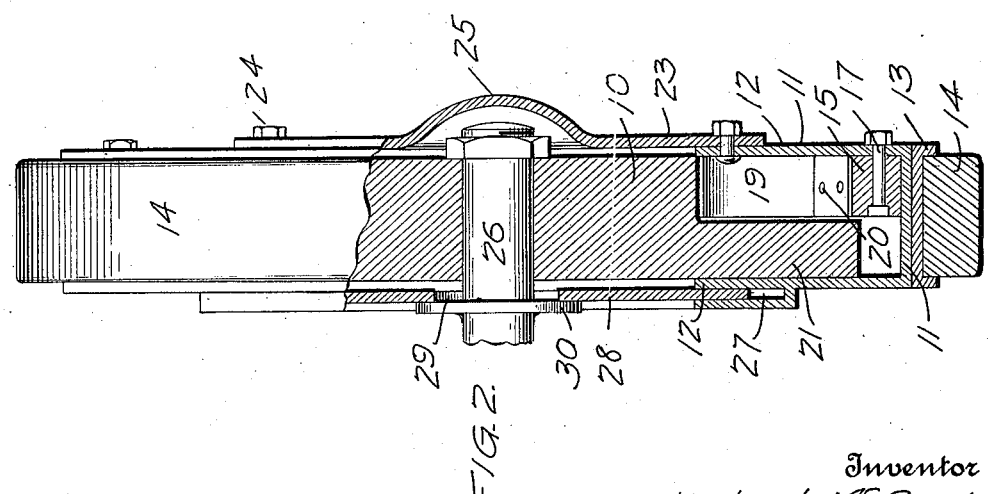
Inventor
Charles J. McCord.
Witnesses
By Victor J. Evans
Attorney

UNITED STATES PATENT OFFICE.

CHARLES J. McCORD, OF ALPHA, MICHIGAN.

SPRING-WHEEL.

1,309,532.   Specification of Letters Patent.   Patented July 8, 1919.

Application filed November 12, 1918. Serial No. 262,185.

*To all whom it may concern:*

Be it known that I, CHARLES J. McCORD, a citizen of the United States, residing at Alpha, in the county of Iron and State of Michigan, have invented new and useful Improvements in Spring-Wheels, of which the following is a specification.

This invention relates to spring wheels, and is an improvement upon the application filed by me June 12, 1918, Serial No. 239,606, and allowed Sept. 13, 1918.

An object of the present invention is to improve the construction of the wheel shown and described in the above mentioned application by a different arrangement of the spokes, so that the load will be more gradually transferred from one spoke to the other.

Another object is the provision of a novel form of hub, by means of which pressure is distributed to a number of spokes, which are arranged in pairs, the weight being sustained by the spokes of several pairs and gradually transferred around the periphery of the wheel.

With the above and other objects in view, the invention includes the following novel construction and arrangement of parts, to be hereinafter more fully described and illustrated in the accompanying drawings.

In the drawings:

Fig. 2 is an edge view of the wheel partly broken away, and

Fig. 3 is an elevation of the hub attached in the wheel.

Figure 1:
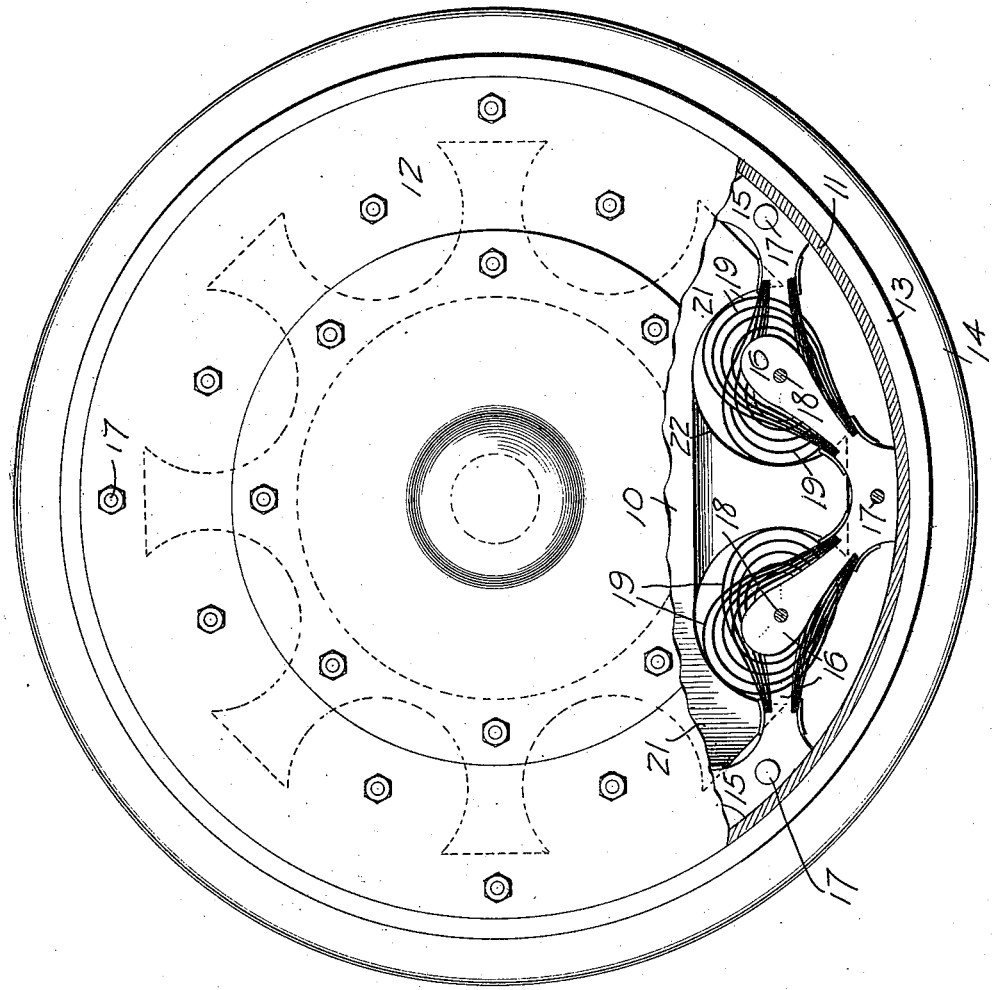
Figure 1 is a side elevation of a spring wheel constructed in accordance with the present invention, parts being broken away to show the interior of the construction of the wheel.

Referring to the drawings in detail, wherein like characters of reference denote corresponding parts, the wheel comprises a hub 10 and a felly 11.

The felly 11 is preferably formed of metal and is channel shape in cross section to provide inwardly extending side walls 12, while the outer periphery of the felly has secured thereon a rim 13. This rim may be of the demountable type and carry a tire 14, which may be either pneumatic or solid, the latter being illustrated.

Located within the felly 11 is a plurality of spokes, the latter being arranged in pairs and disposed tangentially with respect to the wheel. Each pair of spokes comprises a base 15 and a pair of oppositely extending tangentially disposed arms 16, herein shown as integral with the base, but it is, of course, obvious that these arms may be separately formed and secured to the base in any desired manner. The spokes are arranged in staggered relation upon the inside of the felly 11, each alternate set of spokes being bolted or otherwise secured to the opposite side walls 12, as indicated at 17. By arranging the spokes in this formation, the ends of adjacent spokes overlap and are bolted together, as shown at 18.

Secured upon each of the spokes or arms 16, is a plurality of flat springs 19, these springs being arranged one over the other and having their ends riveted, or otherwise secured to the ends of the arms or spokes 16 adjacent the base 15, as shown at 20. This provides rounded or bowed portions, which are spaced apart and surround the inner ends of the arms or spokes, to provide a compressible end for the latter.

The hub 10 is provided around its periphery with spaced lugs 21, each alternate lug being offset or staggered for contacting engagement with the opposed ends of the arms or spokes of alternate pairs of spokes. This staggered formation of the lugs 21 is formed by cutting away the lugs substantially one-half the thickness of the hub. The side edges of each of the lugs 21 is curved as shown at 22, and this curved edge engages the rounded ends of the spring 19.

By referring to Fig. 1 it will be seen that the weight from a vehicle will be transferred to the hub and to the spring of the spokes. As the weight increases the springs are further depressed by the curved edges 22 of the lugs 21 moving downward and depressing or bowing the springs 19, the weight being gradually taken up by each successive spring in the downward movement of the hub.

While the wheel herein shown and described is formed of sixteen spokes, with four pairs arranged upon each side of the felly, it is, of course, obvious, that this number may be increased, either by increasing the diameter of the wheel or by arranging one or more additional rows of spokes, so as to provide twenty-four, thirty-two, or any desired number. Secured to the side walls 12 of the felly 11 upon the outer face of the wheel, is a dust plate 23. This plate is secured through the medium of bolts or other fastening devices 24, and is provided with a substantially semi-spherical center 25, to provide space for the securing nut of the axle spindle 26. Upon the opposite or inner face of the wheel, the wall of the felly 11 carries an inwardly extending circumferential groove 27, within which is positioned an annular dust plate 28, having an opening 29 therein for the passage of the spindle 26. The opening 29 is closed by a flange 30 carried by the spindle.

The invention is susceptible of various changes in its form, proportions and minor details of construction, and the right is reserved to make such changes as properly fall within the scope of the appended claims.

Having described the invention, what is claimed is:

1. A spring wheel comprising a channel shaped felly, spokes secured therein, said spokes being arranged in pairs and comprising divergent tangentially disposed arms, each pair of arms being arranged in staggered relation, cushioning means for said arms, a hub and radially disposed lugs projecting from said hub into the channel shaped felly, said lugs being also arranged in staggered relation for contact with the cushioning means of alternate pairs of arms.

2. A spring wheel comprising a channel shaped felly, spokes secured therein, said spokes being arranged in pairs and each adjacent pair being arranged in staggered relation and comprising a base, means for securing said base within the felly, tangentially disposed arms extending from said base, a plurality of leaf springs arranged one upon the other, said springs having their ends secured to the inner ends of the arms and their bowed portions surrounding the outer ends of said arms, a hub and radially disposed staggered lugs projecting from said hub into the felly engaging one arm of each alternate pair of spokes.

3. A wheel comprising a hub, a felly, tangentially disposed staggered spokes secured to said felly, springs surrounding the inner ends of the spokes and radial lugs projecting from said hub for contact with said springs.

4. A wheel comprising a hub, a felly, tangentially disposed staggered spokes secured to said felly, bowed springs secured to the spokes and extending beyond the inner ends thereof to form rounded compressible ends and lugs extending diametrically from the hub, said lugs being offset and provided with curved edges for engagement with the rounded compressible ends of the spokes.

5. A wheel comprising a hub, a felly, tangentially disposed staggered spokes arranged in pairs, the spokes of one pair extending toward the spokes of the adjacent staggered pair and having their inner ends connected together, bowed springs secured to the spokes and extending beyond the inner ends thereof to form rounded compressible ends, staggered lugs extending from the hub and curved edges formed on each of said lugs for contacting engagement with one spoke of each alternate pair.

In testimony whereof I affix my signature.

CHARLES J. McCORD.

Copies of this patent may be obtained for five cents each, by addressing the "Commissioner of Patents, Washington, D. C."